US010969839B2

(12) United States Patent
Cass et al.

(10) Patent No.: US 10,969,839 B2
(45) Date of Patent: *Apr. 6, 2021

(54) RESTRICTING CURRENT DRAW IN WEARABLE DEVICES

(71) Applicant: Intel Corporation, Santa Clara, CA (US)

(72) Inventors: Devin Cass, San Francisco, CA (US); David Niemira, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/568,409

(22) PCT Filed: Nov. 22, 2016

(86) PCT No.: PCT/US2016/063413
§ 371 (c)(1),
(2) Date: Oct. 20, 2017

(87) PCT Pub. No.: WO2018/097821
PCT Pub. Date: May 31, 2018

(65) Prior Publication Data
US 2018/0299934 A1 Oct. 18, 2018

(51) Int. Cl.
*G06F 1/26* (2006.01)
*G06F 1/32* (2019.01)
(Continued)

(52) U.S. Cl.
CPC .............. *G06F 1/206* (2013.01); *G05F 1/56* (2013.01); *G06F 1/163* (2013.01); *G06F 1/32* (2013.01);
(Continued)

(58) Field of Classification Search
CPC ...................................................... G06F 1/206
See application file for complete search history.

(56) References Cited

U.S. PATENT DOCUMENTS 7,468,877 B2   12/2008   Oki et al.
9,270,111 B2   2/2016    Ando et al.
(Continued)

FOREIGN PATENT DOCUMENTS

JP          5601089 B2      10/2014
WO       2015/056043 A1     4/2015

OTHER PUBLICATIONS

International Search Report and Written Opinion dated Jul. 24, 2017, issued in related International Application No. PCT/US2016/063413, 17 pages.
(Continued)

*Primary Examiner* — Mohammed H Rehman
(74) *Attorney, Agent, or Firm* — Schwabe, Williamson & Wyatt, P.C.

(57) ABSTRACT

Apparatuses, methods and storage medium associated with restricting current draw in wearable devices are disclosed herein. In embodiments, a wearable computing device may include a power source, one or more components coupled with each other and to the power source to perform wearable computing; and control circuitry coupled with the one or more components, the control circuitry to: identify a threshold selected based on a power consumption model of the wearable computing device; ascertain whether current draw from the power source is greater than the threshold; and restrict the current draw from the power source of the wearable computing device based on a signal output from one of the one or more components, in response to the current draw is ascertained to be greater than the threshold. Other embodiments may be disclosed or claimed.

25 Claims, 6 Drawing Sheets

(51) Int. Cl.
*G06F 1/20* (2006.01)
*G06F 1/16* (2006.01)
*G06F 1/3296* (2019.01)
*G06F 1/3206* (2019.01)
*G05F 1/56* (2006.01)

(52) U.S. Cl.
CPC .......... *G06F 1/3206* (2013.01); *G06F 1/3296* (2013.01)

(56) References Cited

U.S. PATENT DOCUMENTS

| | | | |
|---|---|---|---|
| 9,659,063 B2* | 5/2017 | Cammert | G06Q 10/20 |
| 2001/0017756 A1 | 8/2001 | Iyoda | |
| 2004/0003301 A1 | 1/2004 | Nguyen | |
| 2007/0016815 A1* | 1/2007 | Cooper | G06F 1/3203 |
| | | | 713/322 |
| 2007/0176752 A1* | 8/2007 | Mickle | G06K 19/0701 |
| | | | 340/10.33 |
| 2008/0024535 A1* | 1/2008 | Ito | B41J 2/04518 |
| | | | 347/11 |
| 2008/0120520 A1* | 5/2008 | Eriksson | G06F 21/81 |
| | | | 714/25 |
| 2009/0299543 A1 | 12/2009 | Cox et al. | |
| 2010/0153752 A1* | 6/2010 | Tsukamoto | G06F 1/26 |
| | | | 713/300 |
| 2011/0320161 A1 | 12/2011 | Dolbee et al. | |
| 2012/0221871 A1* | 8/2012 | Suryanarayanan | G06F 1/3243 |
| | | | 713/320 |
| 2013/0159575 A1* | 6/2013 | Gooding | G06F 1/3234 |
| | | | 710/262 |
| 2015/0035564 A1 | 2/2015 | Tobin | |
| 2015/0109020 A1 | 4/2015 | Morino | |
| 2015/0229155 A1 | 8/2015 | Sporck et al. | |

OTHER PUBLICATIONS

Patel, S. (Sep. 19, 2007). Power MOSFET Drivers Provide Automotive Lighting Protection and Control [Web log post]. Retrieved Oct. 20, 2017, from URL <<https://www.edn.com/Home/PrintView?contentItemId=4011387>>.

* cited by examiner

RESTRICTING CURRENT DRAW IN WEARABLE DEVICES

CROSS-REFERENCE TO RELATED APPLICATION

The present application is a national phase entry under 35 U.S.C. § 371 of International Application No. PCT/US2016/063413, filed Nov. 22, 2016, entitled "RESTRICTING CURRENT DRAW IN WEARABLE DEVICES," which designates the United States of America, the entire disclosure of which is hereby incorporated by reference in its entirety and for all purposes.

TECHNICAL FIELD

The present disclosure relates to the field of wearable technologies. More specifically, the present disclosure is related to restricting current draw in wearable devices, such as smart watches, smartphones, and so forth, e.g., to prevent undesired heating.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits and computing technology, wearable computer devices, such as smart watches, are becoming increasingly popular. Some wearable computer devices such as connected wearable devices may run on a lithium ion battery or other power source that can provide relatively high electric currents compared to the size and thermal dissipation capabilities of the components they supply power to. For instance, a lithium ion battery may provide power to a small printed circuit board (PCB). When a user attaches a wearable computing device, there is a risk that an electrical or mechanical malfunction could result in significant current draw (errant power dissipation) resulting in an undesired increase in temperature of an external surface of the wearable computing device, which may be close to the user's skin (e.g., in contact with the user's skin in some cases such as the case of a wrist-worn computer device).

Some mobile devices, such as laptops, employ a temperature monitoring system in which a thermistor device is mounted to the PCB and the temperature of the external surface is inferred from the reading of the thermistor combined with prior knowledge of the thermal characteristics of heat transfer between the PCB and the device's enclosure. However, these temperature monitoring systems may not be able to prevent undesired temperature increases in wearable devices due to the interface between the user and the device having several different characteristics such as high thermal conductivity of sensor pins that may have direct contact with the user's skin.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
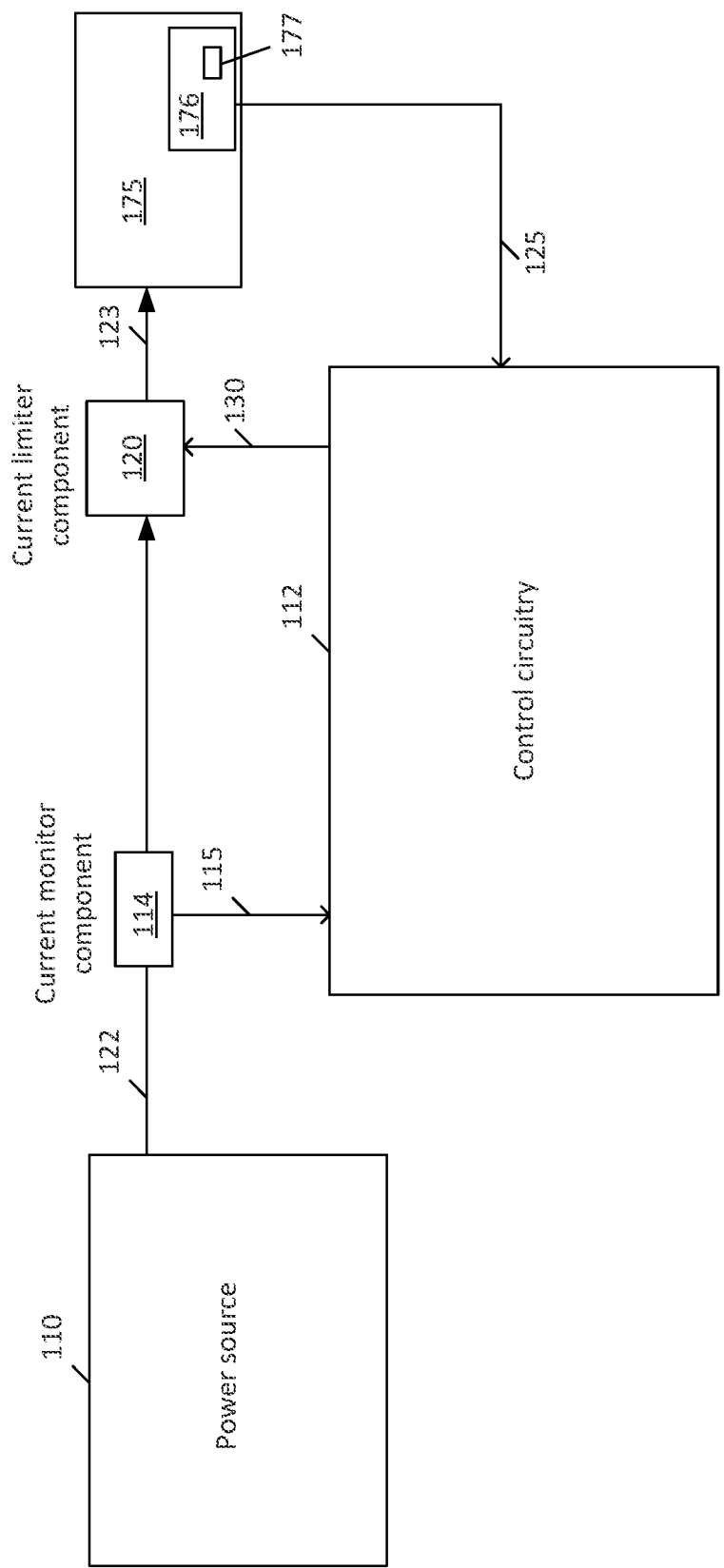
FIG. 1 illustrates an example system equipped with technology for restricting current draw in wearable devices.

Apparatuses, methods and storage medium associated with restricting current draw in wearable devices are disclosed herein. In embodiments, a wearable computing device may include a power source, one or more components coupled with each other and to the power source to perform wearable computing; and control circuitry coupled with the one or more components, the control circuitry to: identify a threshold selected based on a power consumption model of the wearable computing device; ascertain whether current draw from the power source is greater than the threshold; and restrict the current draw from the power source of the wearable computing device based on a signal output from one of the one or more components, in response to the current draw is ascertained to be greater than the threshold. The restriction may be performed to prevent undesired heating.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs having executable instructions, a combinational logic circuit, and/or other suitable components that provide the described functionality.

High current draw over a sufficient duration of time in a wearable computing device may result in undesired heating, for instance in a wrist-worn wearable computing device high current draw may undesirably heat a surface of the wearable computing device that is in direct contact with a user's skin. Undesirable heating may include heating that is noticeable a user and/or uncomfortable to the user, which may or may not involve overheating to the point of failure of any components of the wearable computing device. Monitoring an output of a power source may indicate high current draw. Current draw may be high if something in the wearable compute device has malfunctioned; however, this is not the only reason that current draw may be high.

A monitoring system may be used to force the wearable computing device into a protection mode if current draw from a power source exceeds a threshold, under certain conditions. In some examples, the monitoring system may employ a "watchdog" type strategy in which the wearable computing device may be permitted to bypass the threshold temporarily. Under such an approach, a wearable computing device that is not malfunctioning may operate a subsystem that may temporarily draw current above the threshold without causing the undesired heating (e.g., without causing heating to a selected external surface of the wearable computing device greater than a selected temperature). Current draw greater than the threshold may be regulated by a hardware monitor that may be configured to timeout after a predetermined amount of time.

Such an approach may protect against a condition of high current draw for a relatively long duration, and may provide a more comprehensive supervisory function than systems using a thermistor on a PCB. Such an approach may also have a faster response time than systems using a thermistor on a PCB.

FIG. 1 illustrates an example system 100 equipped with technology for restricting current draw in wearable devices. The system 100 may include control circuitry 112 to determine whether to restrict current draw 122 from the power source 110 in limiting current 123 supplied to a number of components 175 of a wearable device, and output a signal 130 to control a current limiter component 120 based on a result of the determination.

The determination by the control circuitry 112 may be based on an output 115 of a current monitor component 114 and a signal 125 (e.g., a mask signal) asserted by a component 176 of the components 175. The control circuitry 112 may transmit the signal 130 to activate the current limit component 120 if the current draw 122 is greater than a preset threshold based on the signal 115 and the signal 125 is inactive or the signal 125 is active and a duration of constant assertion of the signal 125 is longer than a preset amount of time. The activation of the current limit component 120 may provide current 123 that may be less than the identified current draw, which may prevent the undesired heating on the external surface of the wearable computing device.

In the case of current draw 122 greater than the threshold and the signal 125 is active (but a duration of constant assertion of the signal 125 is not longer than a preset amount of time), the system 100 may permit a finite duration of current draw 122 that may exceed the threshold. However, if the component 176 becomes unresponsive or otherwise does not and/or cannot deactivate the signal 125 for some other reason, then the system 100 may respond to the constant assertion of the signal 125 for the preset amount of time by outputting signal 130 to activate the current limiter component 120.

If the component 176 becomes unresponsive or otherwise does not clear a mask condition and/or cannot activate the signal 125 (for instance due to malware), then in the worst case the current draw 122 may be over the threshold for only the amount of time. Also, if a fault condition of the component 176 causes the signal 125 to be de-asserted, the control circuitry 112 may immediately output the signal 130 to activate the current limiter component 120. In both cases, the wearable computing device may not exhibit the undesired heating on the external surface of the wearable computing device.

In some examples, the power source 110 may be a battery (such as but not limited to a lithium ion battery) and/or an energy harvester (available now or yet to be available) that may have output characteristics similar to battery output characteristics. For instance, in some examples the power source 110 may include a main component (such as a battery or energy harvester) and an auxiliary component (such as the other of the battery or energy harvester) to provide power to the wearable computing device in parallel, or otherwise.

In some examples, the current limiter component 120 may be coupled between the current monitor component 114 and the components 175. In some examples, the component 176 may provide the signal 125.

In some examples, the control circuitry 112 may include a counter (not shown) to count a duration that the signal 125 has been constantly asserted. The control circuitry 112 may determine whether a duration of constant assertion of the signal 125 is longer than a preset amount of time by checking whether a present count (e.g., at a time of identification of current draw greater than the threshold) has reached a preset value, and may output the signal 130 if the preset value is reached. The control circuitry 112 may reset the counter responsive to deactivation of the signal 125.

In some examples, empirical data for given thermal dissipation characteristics (e.g., for a given wearable computing device) may be used to determine the threshold corresponding to the current draw 122 and the amount of time. For setting the amount of time, in some examples this may be set based on a longest event duration of a selected set of events that the wearable computing device may be expected to perform without undesired heating. The selected set may be all individual events that the wearable computing device may be expected to perform, a subset of basic individual events, and/or sequences of events, such as sequence of individual events associated with selected components of the wearable computing device. The amount of time may be set based on a duration of the longest event or event sequence of the set plus an additional non-zero amount to provide a small amount of margin for the longest event or event sequence to complete successfully.

The component 176 to assert the signal 125 may include firmware of the wearable computing device and/or a processing device of the wearable computing device, e.g., a central processor of the wearable computing device (which may be a micro-controller unit (MCU)). In some examples, the component 176 may include a mask function module 177 to programmatically determine times to assert the signal 125. In some examples, the mask function module 177 may be configured to provide the signal 125 for events of the same set of events and/or event sequences used to determine the amount of time used by the control circuitry 112, although examples in which the mask function module 177 may be configured to provide the signal 125 for events and/or event sequences of a different set of events and/or event sequences may be possible and practical.

Figure 2:
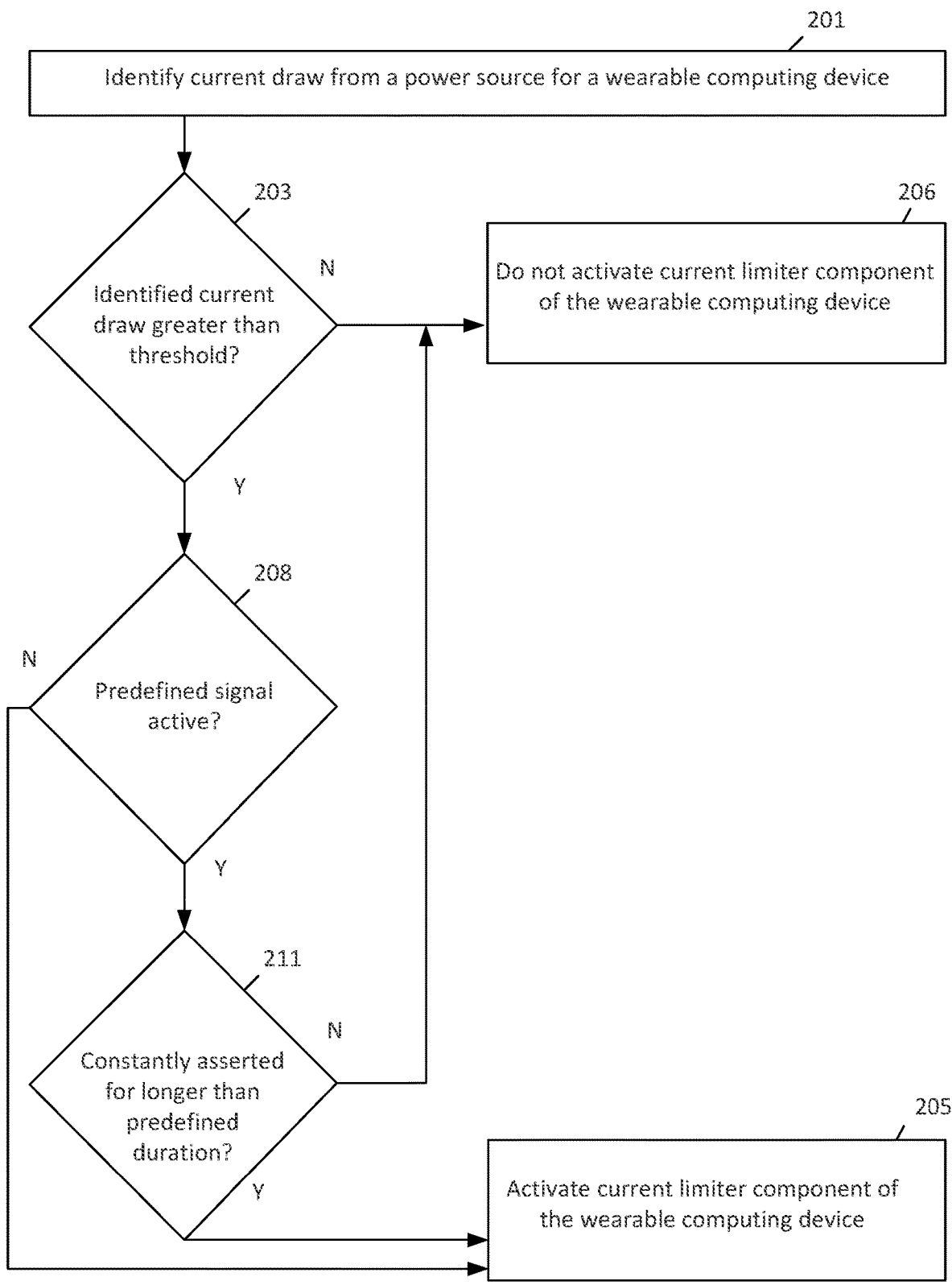
FIG. 2 is a flow chart showing a process of restricting current draw in wearable devices that may be performed by any compute device described herein.

FIG. 2 is a flow chart showing a process 200 of restricting current draw in wearable devices that may be performed by any compute device described herein. In block 201, the control circuitry 112 (FIG. 1) may identify current draw from the power source 110 for a wearable computing device. If the identified current draw is not greater than the threshold in diamond 203, then in block 206 the control circuitry 112 may not activate the current limiter component 120 (FIG. 1).

In connection with an identified current draw greater than the threshold in diamond 203, the control circuitry 112 may identify whether a predefined signal (e.g. a mask signal) is active in diamond 208. The control circuitry 112 may activate the current limiter component 120 in the event that the predefined signal is not active in diamond 208.

In connection with the predefined signal active in diamond 208, in diamond 211 the control circuitry 112 may identify whether the predefined signal has been constantly asserted for longer than a predefined duration. The control circuitry 112 may activate the current limiter component 120 in block 205 in the event that the predefined signal has been asserted for longer than the predefined duration in diamond 211. If the predefined signal has not been constantly asserted for longer than the predefined duration in diamond 211, then in block 206 the control circuitry 112 may not activate the current limiter component 120.

Figure 3:
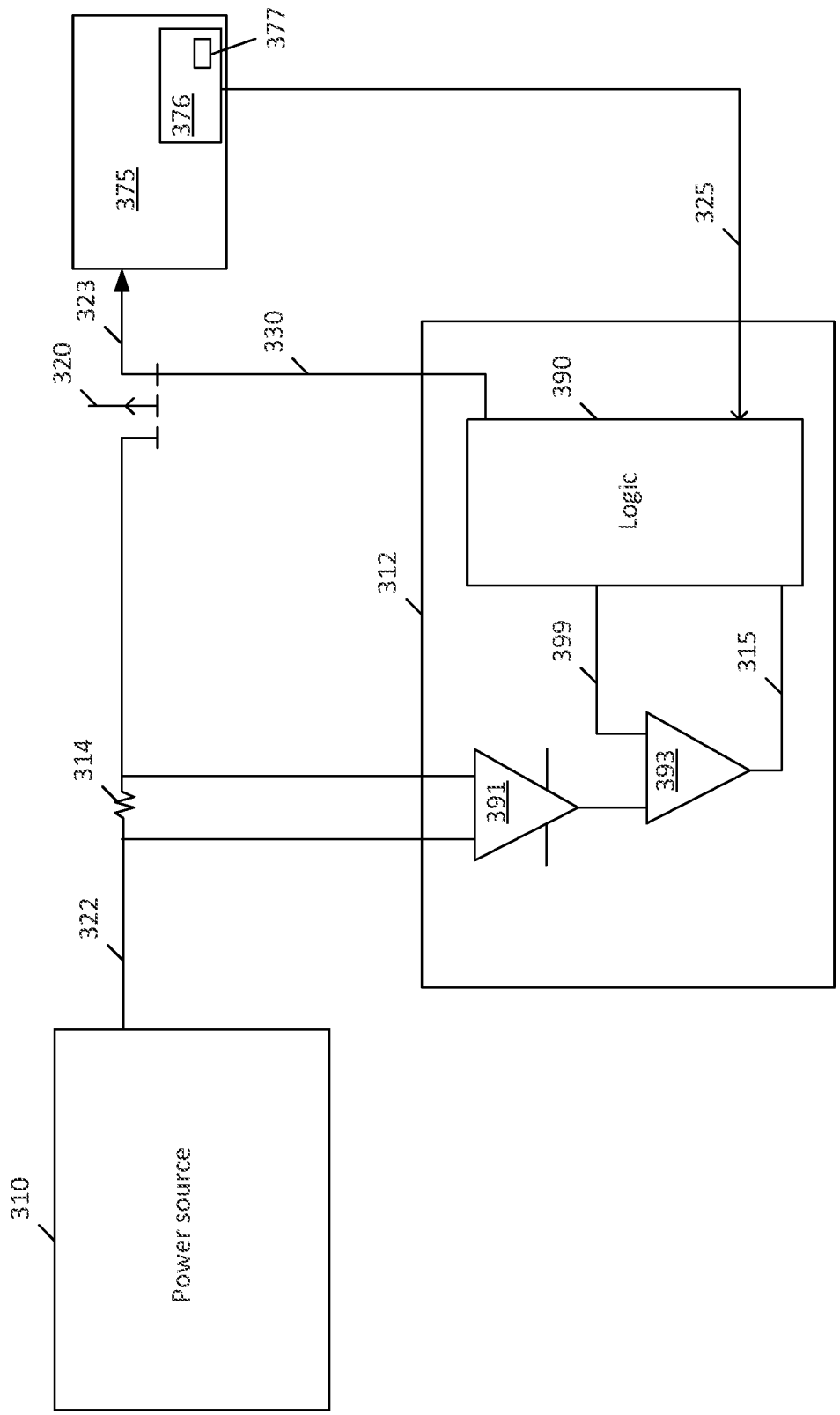
FIG. 3 illustrates an example of another system equipped with technology for restricting current draw in wearable devices, according to various embodiments.

FIG. 3 illustrates an example of another system 300 equipped with technology for restricting current draw in wearable devices, according to various embodiments. The power source 310 may be similar to the power source 110 (FIG. 1), and the current draw 322 may be similar to the current draw 122 (FIG. 1). The component 376 of a number of components 375 may be similar to the component 176 (FIG. 1) of the number of components 175 (FIG. 1), and a mask function module 377 may be similar to the mask function module 177 (FIG. 1).

A sense resistor 314 may be one example of a current monitor component 114 (FIG. 1), and an isolation FET (field effect transistor) 320 may be one example of a current limiter component 120 (FIG. 1). Current 323 supplied to the number of components 375 may be less than the current draw 322 when the isolation FET 320 is activated.

The control circuitry 312 may be one example of the control circuitry 112 (FIG. 1). The control circuitry 312 may include a current sense amplifier 391 with inputs coupled to terminals of the sense resistor 314. The sense resistor 313 may provide a voltage representative of the current draw 322.

The control circuitry 312 may include a comparator 393 with inputs coupled to an output of the current sense amplifier 391 and a reference signal 399. The comparator 393 may compare the representative voltage to a reference voltage of the reference signal 399 to determine whether the current draw 322 is greater than a threshold. The threshold may be determined by modeling power consumption of the wearable computing device, and may be implemented by selecting a value of the current sense resistor 314 and/or a value of the reference voltage based on the model.

The control circuitry 312 may include logic 390 to output the signal 330, which may be similar to the signal 130 (FIG. 1), and which may turn on the isolation FET 320 when asserted. The logic 390 also may output the reference signal 399. The logic may receive as inputs the signal 325, which may be similar to the signal 125 (FIG. 1), and the comparator 393 may output signal 315, which may be similar to the signal 115 (FIG. 1).

In other examples, functionality described with respect to the logic 390 may be implemented using a processing device to execute instructions stored on memory (to perform functions similar to functions performable by the logic 390). In these examples, the processing device may be an auxiliary processing device to operate independently of a state of a separate component to generate the signal 325 (e.g., to operate independently of a state of a central processor of the wearable computing device).

Figure 4:
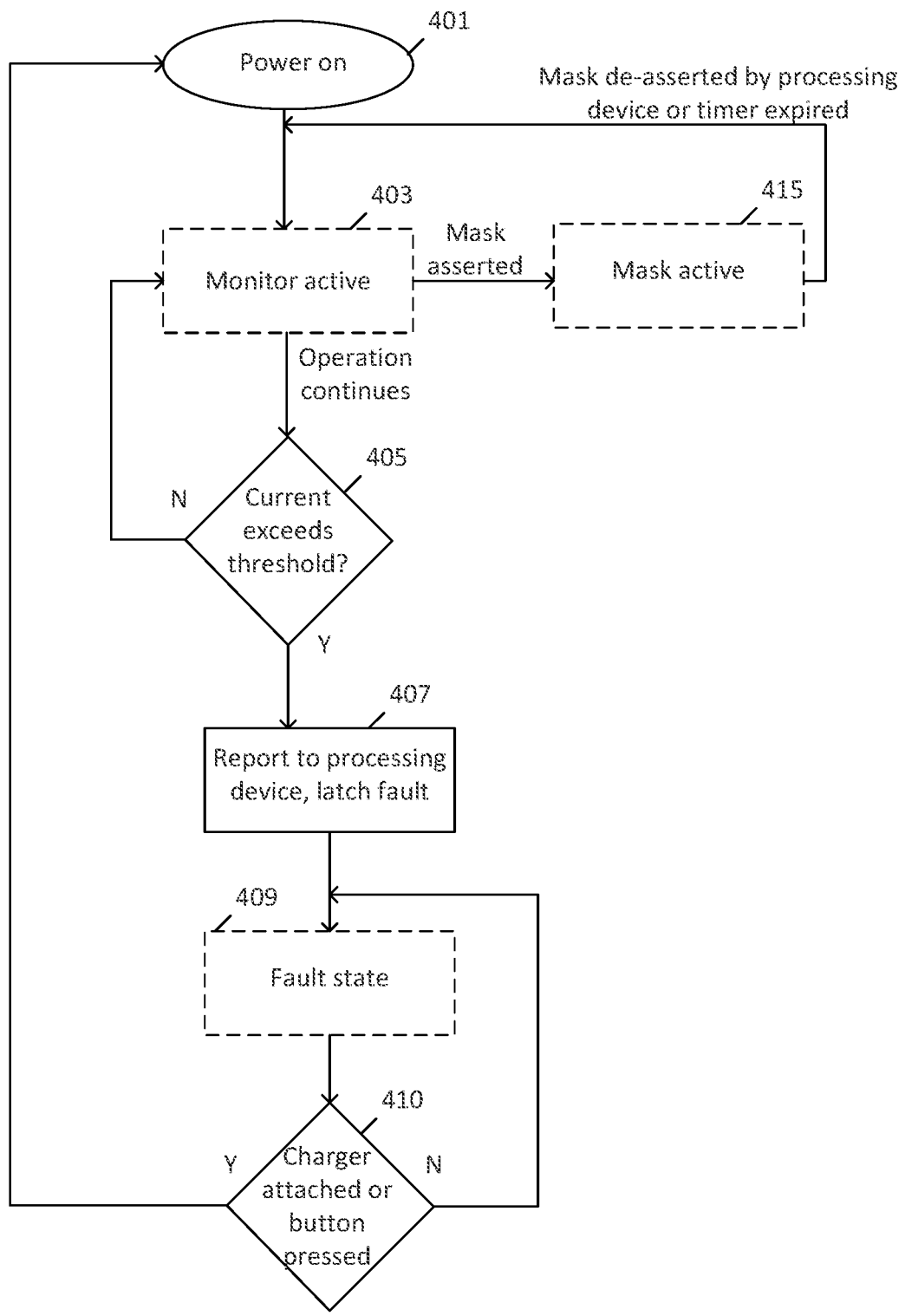
FIG. 4 is a flow chart showing a process of restricting current draw in wearable devices that may be performed by the logic of FIG. 3.

FIG. 4 is a flow chart showing a process 400 of restricting current draw in wearable devices that may be performed by the logic 390 of FIG. 3. The dashed line square blocks of FIG. 4 may indicate states.

The process 400 may start in response to power on 401. A state of the monitor may be active in block 403. Referring now to block 415, a state of the mask may be active when the signal 325 (FIG. 3) is asserted. In a mask active state, current draw may be above the threshold (e.g., the logic 390 may receive the signal 315 (FIG. 3) during this time period indicating as much without asserting current limiting). If the mask is de-asserted or a mask timer expires, a state of the mask is no longer active, and the process 400 returns to the monitor active state of block 403 to check for current exceeding the threshold in diamond 405. The mask timer may act as a software watchdog to prevent the monitor from being masked for a period of time associated with undesired heat on the external surface of the wearable computing device When a state of the mask is inactive because the signal is de-asserted and/or the mask timer expires, then a current limiter component may be asserted. A signal 315 (FIG. 3) indicating current greater than a threshold may result in a transition from diamond 405 to block 407. In block 407, the logic 390 may report to a component 376 (FIG. 3) in block 407 to indicate latch fault. The logic 390 may enter a fault state 409. In some embodiments, the fault state 409 may be manually cleared in diamond 410 by a user response such as button press and/or attachment of the wearable computing device to a dock (or some other charge attach event).

Figure 5:
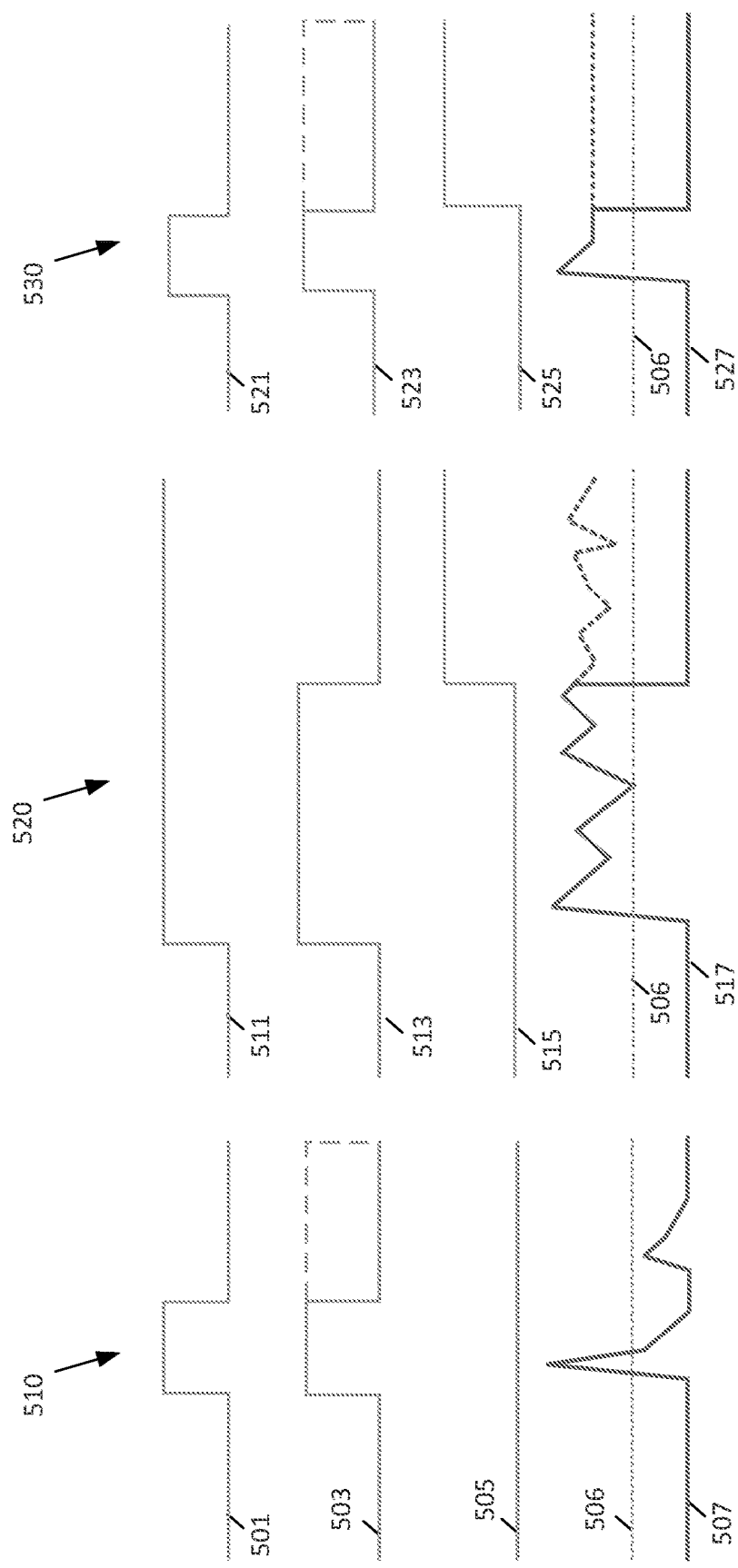
FIG. 5 illustrates example waveforms corresponding to normal operation, non-hardware failure, and hardware failure, respectively, in an example operating according to the process of FIG. 4.

FIG. 5 illustrates example waveforms corresponding to normal operation, non-hardware failure, and hardware failure, respectively, in an example operating according to the process of FIG. 4.

Normal operation 510 may include the component 376 (FIG. 3) asserting the mask signal. Example waveforms 501, 503, 505, and 507 for the mask signal, the mask timer, fault status, and current (e.g., battery current in some embodiments), respectively, are shown. Asserting the mask signal may start the mask timer (e.g. the mask timer waveform 503 rises in connection with the mask signal waveform 501 rising). When the monitor is masked, the current may be allowed to rise to a level greater than the threshold (e.g., the current waveform 507 is shown to exceed the threshold 506 in the period in which the mask signal waveform 501 is high). However, in normal operation the mask signal waveform 501 may drop prior to a count for duration of constant assertion of the mask signal reaching a predetermined value. The dashed line from mask timer waveform 503 denotes the latest time that mask timer waveform 503 may drop in normal operation (where the count does not reach the predetermined value).

Also, normal operation 510 illustrates that the current waveform 507 may operate at a value below the threshold 506 while the mask is not asserted without triggering activation of the current limiting component (the second peak of the current waveform 507 does not exceed the threshold 506 while the mask signal waveform is low, and the fault status waveform 505 does not rise). Also, while the mask is asserted in the normal operation, the current waveform 507 may be above or below the threshold 506 (while the mask signal waveform 501 is high the current waveform 507 is at various levels below and above the threshold 506).

A non-hardware failure 520 (e.g., firmware freeze) may occur if firmware running on the component 376 (e.g., an MCU) does not de-assert the mask. Example waveforms 511, 513, 515, and 517 for the mask signal, the mask timer, fault status, and current (e.g., battery current in some embodiments), respectively, are shown. Asserting the mask signal may start the mask timer (e.g., the mask timer waveform 513 rises in connection with the mask signal waveform 511 rising). However, the mask is not de-asserted by the firmware running on the component 376. The fault status waveform 515 goes high at a time that the count reaches the predetermined value. The mask timer waveform 513 may drop as the counter is reset in connection with the fault. The current waveform 517 drops below the threshold 506 in connection with the current limiter component being activated due to the fault. The dashed line segment from the current waveform 517 illustrates what the current could have been if the current limiting component did not engage.

A hardware failure 530 may occur if hardware associated with the component 376 fails (e.g. a short circuit due to water entering an enclosure of the wearable computing device and causing the component 576 to fail). Example waveforms 521, 523, 525, and 527 for the mask signal, the mask timer, fault status, and current (e.g., battery current in some embodiments), respectively, are shown. Asserting the mask signal may start the mask timer (e.g., the mask timer waveform 523 rises in connection with the mask signal waveform 521 rising). However, due to hardware failure the component 376 stops asserting the mask while current is greater than the threshold (e.g., the mask signal waveform 521 drops due to non-operation of component 576 and the current waveform 527 is greater than the threshold 506), the fault status waveform 525 goes high. The current waveform 527 drops below the threshold 506 in connection with the current limiter component being activated due to the fault. The dashed line segment from the current waveform 527 illustrates what the current could have been if the current limiting component did not engage. Also, as illustrated the mask timer waveform 523 may go low in connection with the mask no longer being asserted (the dashed line from mask timer waveform 523 denotes where a count would have reached the predetermined value had the mask timer waveform 523 not dropped due to non-operation of component 576).

Figure 6:
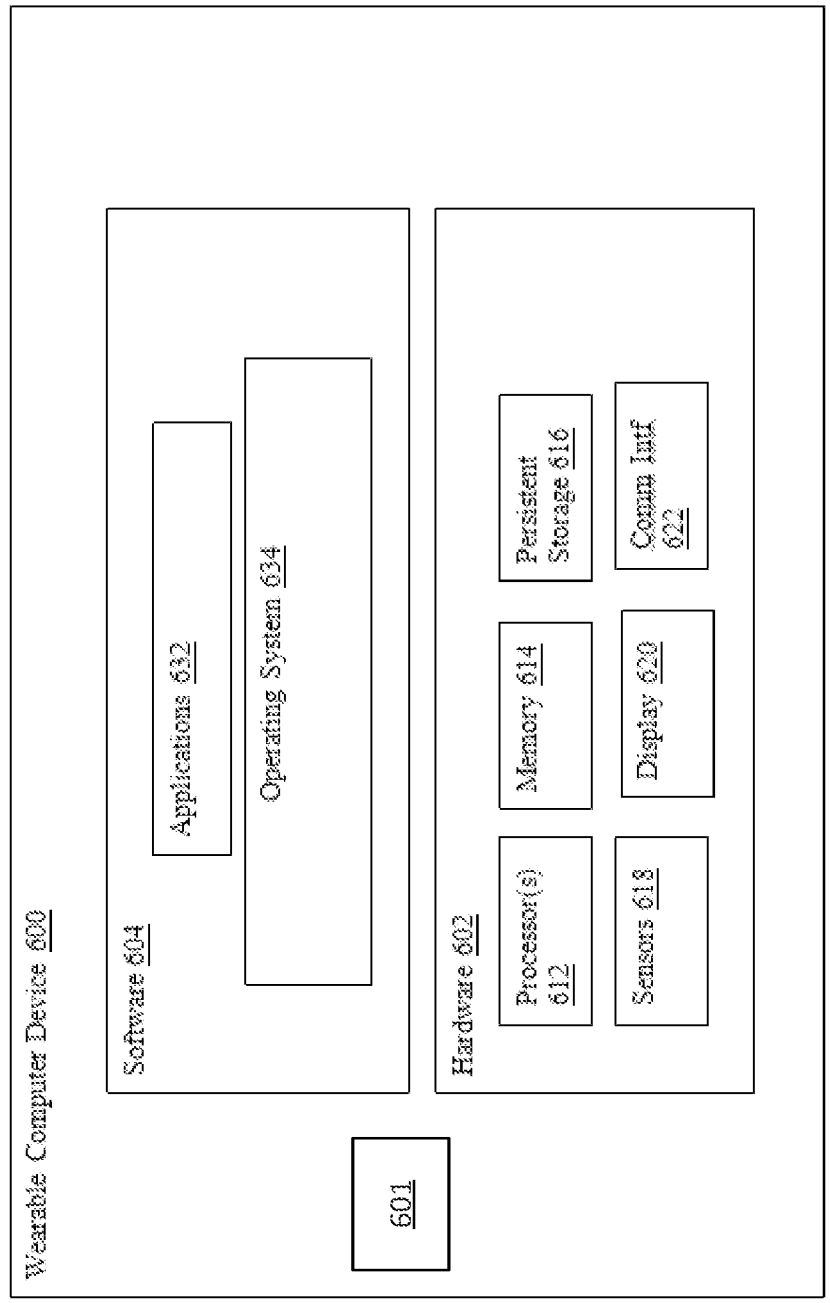
FIG. 6 illustrates example architecture of a wearable computer device, in accordance to various embodiments.

FIG. 6 illustrates example architecture of a wearable computer device 600, in accordance to various embodiments. The wearable computer device 600 may operate according to the current restriction technology of the present disclosure, according to various embodiments. Wearable computer device 600 may a current restriction arrangement 601, which may include the components of FIG. 1.

Referring again to FIG. 6, as illustrated, in embodiments, wearable computer device 600 may include hardware 602 and software 604. Hardware 602 may include one or more components to perform wearable computing (by operation thereof), such as processor(s) 612, memory 614, persistent storage 616, sensors 618, display 620, and communication interface 622. Processor(s) 612 may be any one of a number of processors known in the art, each having one or more processor cores. Memory 614 may be any known volatile or non-volatile memory in the art, suitable for storing instructions for execution and working data, in particular, instructions and data of applications 632 and OS 634. Memory may include instructions corresponding to the mask function module 177 described with respect to FIG. 1, in some embodiments. Memory 614 may include a hierarchy of cache memory and system memory. Both the cache and system memory may be respectively organized into segments and pages. Persistent storage 616 may be any known persistent mass storage suitable for providing persistent storage of instructions and data of applications 632 and OS 634, e.g., solid state storage, magnetic or optical disk drives. Sensors 618 may include any known sensors of a wearable device. Display 620 may be any known display device, including e.g., touch sensitive screen. Communication interface 622 may include any number of wireless communication or networking interfaces known, such as WiFi, 3G/4G, Bluetooth®, Near Field Communication, LiFi, and so forth.

Software 604 may include operating system (OS) 634 and application 632. OS 634 may be any one of a number of wearable computer device OS known in art. Applications 632 may likewise be any one of a number of known applications for wearable computer devices, e.g., personal health application, calendar or other personal information management (PIM) applications.

At least one of processors 612 may be packaged together with a computer-readable storage medium having the mask function module 177 described with reference to FIG. 1 (in lieu of storage in memory 614 and/or storage 616). For one embodiment, at least one of processors 612 may be packaged together with a computer-readable storage medium having mask function module 177 to form a System in Package (SiP). For one embodiment, at least one of processors 612 may be integrated on the same die with a computer-readable storage medium having mask function module 177. For one embodiment, at least one of processors 612 may be packaged together with a computer-readable storage medium having mask function module 177 to form a System on Chip (SoC).

EXAMPLES

Example 1 may be a wearable computing device, comprising: a power source; one or more components coupled with each other and to the power source to perform wearable computing; and control circuitry coupled with the one or more components, the control circuitry to: identify a threshold selected based on a power consumption model of the wearable computing device; ascertain whether current draw from the power source is greater than the threshold; and restrict the current draw from the power source of the wearable computing device based on a signal output from one of the one or more components, in response to the current draw is ascertained to be greater than the threshold.

Example 2 may include the subject matter of example 1, and the control circuitry comprises an isolation field effect transistor (FET) to isolate the power source from at least one of the one or more components to restrict the current draw from the power source.

Example 3 may include the subject matter of any of example 1-2, and the control circuitry comprises: a sense resistor coupled between the power source and a current limiter component; and a current sense amplifier with inputs coupled to terminals of the sense resistor.

Example 4 may include the subject matter of any of examples 1-3, and the control circuitry comprises a counter to count a duration that the signal is asserted, the control circuitry to restrict the current draw from the power source based on whether the count reaches a preset value.

Example 5 may include the subject matter of any of examples 1-4, and the control circuitry is to restrict the current draw when the signal is not active or when the signal is active and a count of the counter is greater than the preset value.

Example 6 may include the subject matter of any of examples 1-5, and the control circuitry further comprises a comparator with a first input to receive a reference signal corresponding to the threshold and a second input coupled to an output of the current sense amplifier.

Example 7 may include the subject matter of any of examples 1-6, and the current limiter component comprises an isolation FET.

Example 8 may include the subject matter of any of examples 1-7, and the signal is to be inactive responsive to the one of the one or more components in a predetermined failure state.

Example 9 may include the subject matter of any of examples 1-8, and the power source comprises a battery.

Example 10 may include the subject matter of any of examples 1-9, and the one or more components comprise a micro-controller unit (MCU).

Example 11 is a wearable computing device, comprising: a current limiter component coupled between one or more components to perform wearable computing and a power source for the one or more of components; and control circuitry coupled with the one or more components, the control circuitry to measure current draw from the power source and activate the current limiter component in response to the current draw greater than a preset threshold that is based on a power consumption model for the wearable computing device and a signal output from one of the components of the one or more components is inactive or a duration of constant assertion of the signal is longer than a preset amount of time.

Example 12 includes the subject matter of example 11, and the component of the one or more components is to output the signal based on a state of the one or more components.

Example 13 may include the subject matter of any of examples 11-12, and the control circuitry is operable separately from the component of the one or more components.

Example 14 may include the subject matter of any of examples 11-13, and the power source comprises a battery.

Example 15 may include the subject matter of any of examples 11-14, and the control circuitry includes a comparator to compare the current draw to a signal corresponding to the preset threshold.

Example 16 is a method, comprising: modeling power consumption of a wearable computing device; identifying current draw from a power source for the wearable computing device; and determining whether to limit the current draw by the wearable computing device from the power source, the current draw to be limited when the current draw is greater than a threshold value selected based on a result of the modeling and a predefined signal of a central processing device of the wearable computing device is not asserted or the predefined signal is asserted and a count corresponding to constant assertion of the predefined signal is greater than a predefined value at a time of the identification.

Example 17 includes the subject matter of example 16, and the current draw is to exceed the threshold value when the predefined signal is asserted at the time of the identification and the count is not greater than the predefined value.

Example 18 includes the subject matter of any of examples 16-17, and the central processing device is one of one or more components of the wearable computing device, and the method further comprises isolating at least one component of the one or more components from the power source in response to determining to limit the current draw.

Example 19 includes the subject matter of any of examples 16-18, and the central processing device is one of one or more components of the wearable computing device, and the method further comprises activating an isolation field effect transistor (FET) that is coupled between the power source and the one or more components in response to determining to limit the current draw.

Example 20 includes the subject matter of any of examples 16-19, and the threshold value and the predefined value are selected to prevent a temperature of a contact surface on the enclosure from reaching a threshold temperature.

Example 21 is a system, comprising: a wearable mobile device to be worn by a person; a power source inside an enclosure of the wearable mobile device; one or more components inside the enclosure of the wearable mobile device and coupled with each other and to the power source to perform wearable computing; and control circuitry coupled with the one or more components, the control circuitry to: identify a threshold selected based on a power consumption model of the wearable computing device; ascertain whether current draw from the power source is greater than a threshold; and restrict the current draw from the power source of the wearable mobile device based on a signal output from one of the one or more components, in response to the current draw is ascertained to be greater than the threshold.

Example 22 includes the subject matter of example 21, and the control circuitry comprises an isolation field effect transistor (FET) to isolate the power source from at least one of the one or more components of the wearable device to restrict the current draw from the power source.

Example 23 includes the subject matter of any of examples 21-22, and the control circuitry comprises: a sense resistor coupled between the power source and a current limiter component; and a current sense amplifier with inputs coupled to terminals of the sense resistor.

Example 24 includes the subject matter of any of examples 21-23, and the control circuitry comprises a counter to count a duration that the signal is asserted, the control circuitry to restrict the current draw from the power source based on whether the count reaches a preset value.

Example 25 includes the subject matter of any of examples 21-24, and the power source comprises a battery.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A wearable computing device, comprising:
a power source;
one or more components coupled with each other and to the power source to perform wearable computing; and
control circuitry coupled with the one or more components, the control circuitry to:
identify a threshold selected based on a power consumption model of the wearable computing device;
ascertain whether current draw from the power source as an output current of the power source is greater than the threshold; and
restrict the current draw from the power source by providing an input current to the one or more components of the wearable computing device when a mask signal from one of the one or more components is de-asserted due to a hardware failure of the one or more components, and the current draw is ascertained to be greater than the threshold, wherein the input current to the one or more components is less than the current draw from the power source.

2. The wearable computing device of claim 1, wherein the control circuitry comprises an isolation field effect transistor (FET) to isolate the power source from at least one of the one or more components to restrict the current draw from the power source.

3. The wearable computing device of claim 1, wherein the control circuitry comprises:
a sense resistor coupled between the power source and a current limiter component; and
a current sense amplifier with inputs coupled to terminals of the sense resistor.

4. The wearable computing device of claim 3, wherein the current limiter component comprises an isolation FET.

5. The wearable computing device of claim 1, wherein the control circuitry comprises a counter to count a duration that the mask signal is asserted, the control circuitry to restrict the current draw from the power source based on whether the count reaches a preset value.

6. The wearable computing device of claim 5, wherein the control circuitry is to restrict the current draw when the mask signal is asserted and a count of the counter is greater than the preset value.

7. The wearable computing device of claim 5, wherein the control circuitry further comprises a comparator with a first input to receive a reference signal corresponding to the threshold and a second input coupled to an output of a current sense amplifier.

8. The wearable computing device of claim 1, wherein the mask signal is to be de-asserted responsive to the one of the one or more components in a predetermined failure state.

9. The wearable computing device of claim 1, wherein power source comprises a battery.

10. The wearable computing device of claim 1, wherein the one or more components comprise a micro-controller unit (MCU).

11. A wearable computing device, comprising:
a current limiter component coupled between one or more components to perform wearable computing and a power source for the one or more of components; and
control circuitry coupled with the one or more components, the control circuitry to measure current draw from the power source and activate the current limiter component to provide an input current to the one or more components, in response to the current draw greater than a preset threshold and a mask signal from one of the components of the one or more components is de-asserted due to a hardware failure of the one or more components, wherein the input current to the one or more components is less than the current draw from the power source.

12. The wearable computing device of claim 11, wherein the component of the one or more components is to output the mask signal based on a state of the one or more components.

13. The wearable computing device of claim 12, wherein the control circuitry is operable separately from the component of the one or more components.

14. The wearable computing device of claim 11, wherein the power source comprises a battery.

15. The wearable computing device of claim 11, wherein the control circuitry includes a comparator to compare the current draw to a signal corresponding to the preset threshold.

16. A method, comprising:
modeling power consumption of a wearable computing device to determine a threshold value;
identifying current draw from a power source for the wearable computing device; and
determining to provide an input current to one or more components of the wearable computing device when the current draw is greater than the threshold value and a predefined signal of a central processing device of the wearable computing device is de-asserted due to a hardware failure of the one or more components, wherein the input current to the one or more components is less than the current draw from the power source.

17. The method of claim 16, wherein the current draw is to exceed the threshold value when the predefined signal is constantly asserted for less than a predefined value.

18. The method of claim 16, wherein the central processing device is one of the one or more components of the wearable computing device, and the method further comprises isolating at least one component of the one or more components from the power source in response to determining to provide to the one or more components the input current that is smaller than the current draw from the power source.

19. The method of claim 16, wherein the central processing device is one of the one or more components of the wearable computing device, and the method further comprises activating an isolation field effect transistor (FET) that is coupled between the power source and the one or more components in response to determining to provide to the one or more components the input current that is smaller than the current draw from the power source.

20. The method of claim 16, wherein the threshold value and a predefined value are selected to prevent a temperature of a contact surface on an enclosure of the wearable computing device from reaching a threshold temperature.

21. A system, comprising:
a wearable mobile device to be worn by a person;
a power source inside an enclosure of the wearable mobile device;
one or more components inside the enclosure of the wearable mobile device and coupled with each other and to the power source to perform wearable computing; and
control circuitry coupled with the one or more components, the control circuitry to:
identify a threshold selected based on a power consumption model of the wearable computing device;
ascertain whether current draw from the power source as an output current of the power source is greater than a threshold; and
restrict the current draw from the power source by providing an input current to the one or more components of the wearable mobile device when a mask signal from one of the one or more components is de-asserted due to a hardware failure of the one or more components, and the current draw is ascertained to be greater than the threshold, wherein the input current to the one or more components is less than the current draw.

22. The system of claim 21, wherein the control circuitry comprises an isolation field effect transistor (FET) to isolate the power source from at least one of the one or more components of the wearable mobile device to restrict the current draw from the power source.

23. The system of claim 21, wherein the control circuitry comprises:
a sense resistor coupled between the power source and a current limiter component; and
a current sense amplifier with inputs coupled to terminals of the sense resistor.

24. The system of claim 21, wherein the control circuitry comprises a counter to count a duration that the mask signal is asserted, the control circuitry to restrict the current draw from the power source based on whether the count reaches a preset value.

25. The system of claim 21, wherein the power source comprises a battery.

* * * * *